United States Patent [19]

Demetriades

[11] Patent Number: 4,536,911
[45] Date of Patent: Aug. 27, 1985

[54] FLOOR CLEANING PAD

[76] Inventor: Peter G. Demetriades, 2118 Coleman Pl., Henderson, N.C. 27536

[21] Appl. No.: 680,826

[22] Filed: Dec. 12, 1984

[51] Int. Cl.³ .............................................. A47L 13/16
[52] U.S. Cl. .................................. 15/230.12; 15/118; 51/394; 156/306.6; 428/294
[58] Field of Search ............... 15/98, 118, 230, 230.12, 15/230.14, 230.16, 230.19; 51/394, 401, 402, 404; 428/294, 298; 156/306.6

[56]  References Cited

U.S. PATENT DOCUMENTS

| 3,075,222 | 1/1963 | Miller | 15/209 R |
|---|---|---|---|
| 3,154,462 | 10/1964 | Smith, II | 161/154 |
| 3,171,151 | 3/1965 | Sickle et al. | 15/118 |
| 3,413,674 | 12/1968 | Reid | 15/230.12 |
| 3,952,124 | 4/1976 | Mesek | 428/218 |
| 4,098,943 | 7/1978 | Degginger et al. | 428/283 |
| 4,113,911 | 9/1978 | LaFitte et al. | 428/284 |
| 4,162,344 | 7/1979 | Rones | 428/212 |
| 4,178,407 | 12/1979 | Rubens | 428/284 |
| 4,239,792 | 12/1980 | Ludwa | 428/198 |
| 4,241,469 | 12/1980 | Perazzo | 15/209 C |
| 4,403,367 | 9/1983 | Brown et al. | 15/230.12 |
| 4,429,014 | 1/1984 | Isner | 428/152 |
| 4,436,780 | 3/1984 | Hotchkiss et al. | 428/198 |

FOREIGN PATENT DOCUMENTS 2216751  10/1973  Fed. Rep. of Germany ........ 15/230

Primary Examiner—Edward L. Roberts
Attorney, Agent, or Firm—Lalos, Leeds, Keegan, Marsh, Bentzen & Kaye

[57]  ABSTRACT

A reversible hard-floor cleaning pad for use with super high speed and ultra high speed machines. The pad includes a first porous non-woven air-layered web having an upper, floor-cleaning surface and an opposite lower surface. The upper cleaning surface is adapted to clean hard surface floors, such as wood or vinyl, when placed on the floor and rotated by a flooring machine about a vertical axis passing through the center of the first web at super high speeds of at least 1000 revolutions per minute. A second porous non-woven air-layered web having a lower, floor cleaning surface and an opposite upper surface is disposed parallel to and spaced from the first web with the first web lower surface facing the second web upper surface. The second web lower cleaning surface is also adapted to clean hard surface floors when placed on the floor and rotated at super high speeds. A flexible wet-laid non-woven strata layer having uniform directional strength and an upper layer surface and an opposite lower layer surface is positioned between the first and second webs. The first web lower surface is glued directly to the upper layer surface and the second web upper surface directly to the lower layer surface with an elastomer, resin-reinforced non-flammable adhesive. A multi-layer reversible pad is thereby formed having generally uniform strength in all horizontal directions thereby eliminating the tearing and shredding problem previously experienced. Also, a method for making this pad.

21 Claims, 9 Drawing Figures

FLOOR CLEANING PAD

BACKGROUND OF THE INVENTION

This invention relates to floor cleaning pads used to clean hard surface floors such as wood or vinyl. It more particularly relates to such floor cleaning pads formed of non-woven webs and which are used on the present generation of super or ultra high speed flooring machines which rotate at speeds greater than 1000 revolutions per minute.

In the past it was known to make one-quarter inch floor cleaning pads such as has been made by 3M Corporation for a number of years. The next development of floor cleaning pads was to take the pads and glue them together, then roll them into jelly-donut shapes and cut them into one-inch thick members. However, these pads tended to unravel or spin apart. The so-called garnett method has been used primarily in Italy and two layers of mechanically-layered fibers are glued directly together according to this method. Each of these layers, however, due to the manufacturing technique had differential strengths and experienced the same problems as air-layering as discussed next.

The next development in floor cleaning pads was the so-called air-layered non-woven process, such as is described in U.S. Pat. No. 4,162,344, the contents of which are incorporated by reference in their entirety. This is a method of randomly distributing the non-woven fibers, air layering them, then spraying them with a resin and binder, and cutting them to size. However, this method results in the bottom layer of the air-layered web having a shingled effect wherein the surface fibers are at least partially aligned. This shingling tends to weaken the surface and also to present an undesirable appearance. The opposite surface whose fibers are randomly distributed is the preferred outer cleaning surface. Additionally, these pads have perpendicular longitudinal directions of differential strength. This differential strength was generally of no significant consequence until the recent developments of the super high speed flooring machines.

The old flooring machines were designed to rotate at 175 revolutions per minute. This generation was followed by the 325 machines, the so-called high speed machines. The next jump was to the 1000 rpm machines, the super high speed machines. These are not used for stripping or scrubbing where water is involved as the water is thrown every which way. However, they are very good for buffing or spray buffing or re-coating and finishing. In other words, they are used just to maintain the floor. The next development in the machines was the 1500 rpm machine, which was followed by the 2500 propane machine which had its self-contained propane tanks and did not need an electric cord. The next development was the 2000 rpm electric motor machines. These last three machines are very quick and good for maintaining a high gloss, or wet look which is preferred in most public facilities. The history of floor care machines is set forth in "The Road to Ultra High Speed Buffing: Propane Buffers Boost Speeds to Over 2,000 RPM," CM Cleaning Management Magazine, April 1984, page 65, the contents of which are hereby incorporated by reference in their entirety.

With the development of these super high speed machines, the differential in the strengths of the floor pads has caused a number of problems. When the floor pads are subjected to these very high spinning centrifugal forces the pads tend to elongate in their weaker direction. This causes an "ovaling" of the pads and, when the pad hits any object on the floor, the ovaled portion will tear and shred. These pads will last only an average of 2 to 6 hours at these new speeds. If it does not hit anything it will eventually spread and shred. Additionally, the ovaling will cause the pad to expand towards the fiberglass housing portion of the floor machine and impact it thereby tearing the pad. Additionally, when the pads elongate or oval, the flooring machines can vibrate or wobble. Also, if the pad totally shreds, some flooring machines will then impact the floor and mar or burn it.

Janitorial services often are locked (for security purposes) in the building at the beginning of the night to clean the floors, restrooms, and so forth and then let out in the morning. If the janitoral services unexpectedly run out of the floor cleaning pads due for example to their tearing or shredding, the workers are unable to leave the building to get new pads and thus cannot clean the floors that night.

OBJECTS OF THE INVENTION

Accordingly, it is the principal object of the present invention to provide a novel hard-surface floor cleaning pad adapted to clean hard floors such as wood and vinyl.

Another object of the present invention is to provide an improved floor cleaning pad adapted for use with super high speed machines, which rotate at speeds greater than 1000 rpms.

A further object of the present invention is to provide a novel floor cleaning pad having cleaning surfaces formed from webs of nonwoven material which will not unevenly elongate or oval and thereby tear or shred when used at those super high speeds.

A still further object of the present invention is to provide an improved floor cleaning pad which lasts longer than prior cleaning pads.

Another object is to provide an improved reversible floor cleaning pad which better resists tearing and shredding.

A further object is to provide an improved floor cleaning pad which is easy and economical to construct.

A still further object is to provide a novel method for making an improved hard-surface floor cleaning pad used on super high speed or ultra-high speed flooring machines.

Other objects and advantages of the present invention will become more apparent to those persons having ordinary skill in the art from the following description taken in conjunction with the accompanying drawings.

DETAILED DESCRIPTION OF THE PREFERRED EMBODIMENT

Figure 1:
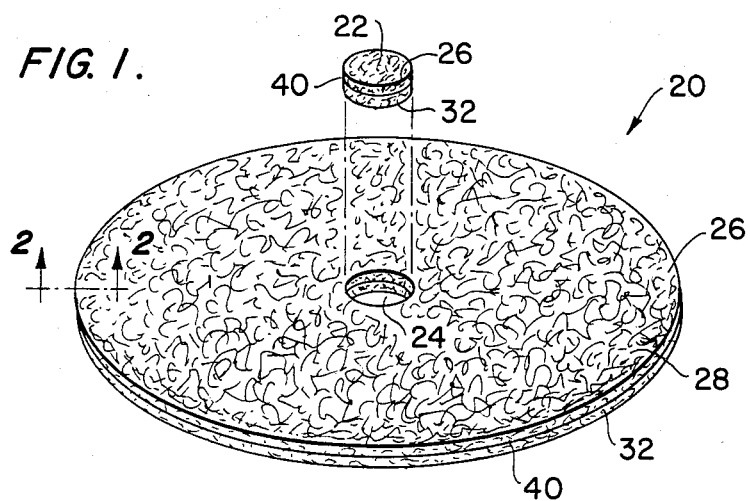
FIG. 1 is a perspective view of a floor cleaning pad embodying the present invention.

Referring to FIG. 1, a reversible floor cleaning pad shown generally at 20 embodying the present invention is illustrated. Floor cleaning pad 20 is configured to have a circular configuration in its top plan view to fit the current design of super high or ultra-high speed floor cleaning machines, such as the "Pioneer '1700' Super Hi-Speed Propane-Powered Floor Buffer", the "Multi-Clean 2000 Floor Machine, the "32-inch Propane" of Diamond Speed Buff Company of Pittsburg, Calif., the "27" Clasic Propane High Speed Buffer", or "Spirit 2700", 37 The Classic 11-24" by American Speed Buff Mfg. Co. Pad 20 has a central portion 22 which has been dye cut and can be removed thereby providing an opening 24 through which it can be connected to the floor cleaning machines. Pad 20 can be mounted to these machines by a suitable easily detachable means such as by a snap ring unit or a bolt unit passing through opening 24 or adhering directly to machine brushes.

Figure 2:
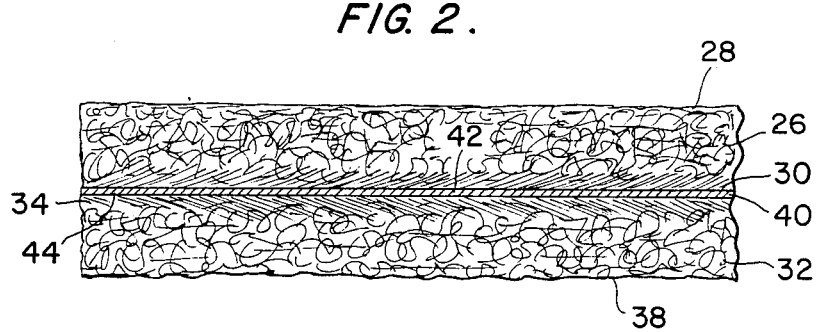
FIG. 2 is an enlarged cross-sectional view taken along line 2—2 of FIG. 1.
Figure 3:
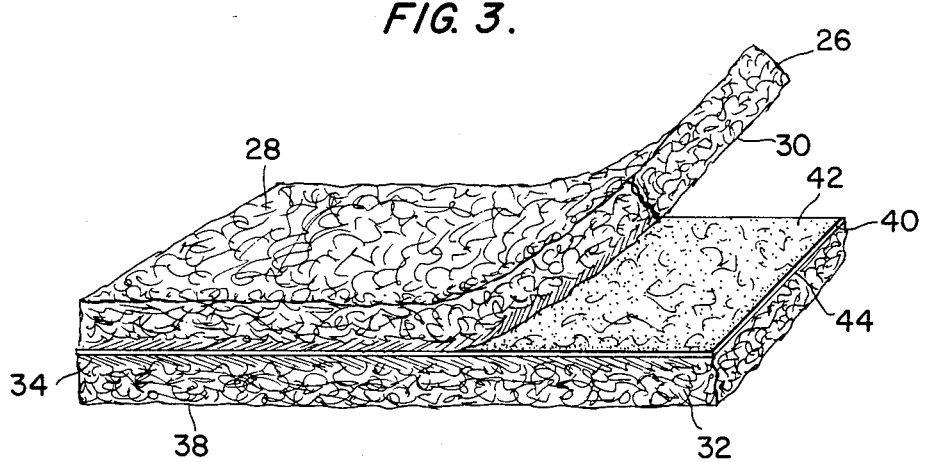
FIG. 3 is an enlarged cross-sectional view of the pad of FIG. 1 having the upper layer shown lifted from the middle layer for illustrative purposes.

Pad 20, very generally, comprises three layers bonded together. The first upper layer 26 is a porous, non-woven, air-layered web of material such as is formed according to the method described in the incorporated patent. Any suitable fibers can be used to form the web either synthetic fibers such as nylon, polyester, or rayon, or natural fibers such as pig bristle or horse hair or it can comprise a high-loft media. It has an upper surface 28 and a lower surface 30. The web of material is positioned so that its shingled surface defines its lower surface 30 and its random-fiber surface defines its upper floor cleaning surface 28 as best shown in FIG. 2.

The lower layer or web 32 comprises a similar web of porous non-woven air-layered material. It similarly is positioned so that its shingled surface forms its upper surface 34 and its random fiber surface defines its lower floor cleaning surface 38. Thus, as best shown in FIG. 2 both of the random surfaces are positioned on the outside surfaces of pad 20 thereby exposing the preferred floor cleaning surfaces as well as presenting a uniform appearance of both sides of this reversible pad.

The middle strata layer 40 is constructed from a thin flexible wet-layed non-woven strata layer having uniform directional strength in all longitudinal directions. Strata layer 40 can be formed of paper, synvar, typar, scrim, duck or screen wire. It provides the uniform dimensional strength to pad 20 to prevent elongation or ovaling of the pad in its weaker direction when used on super high or ultrahigh speed machines. Even if the upper and lower layers 26, 32 were positioned directly together with their weaker directions at 90° to each other, the 45° direction therebetween would still present a slightly weaker direction which would result in elongation of the pad. The present dimensionally-stable middle strata layer 40 positioned therebetween prevents the elongation and ovaling and shredding and tearing previously experienced by floor cleaning pads. It is expected that the present layered pad 20 will last at least 20 hours cleaning hard surface floors at super high speeds without shredding or tearing.

It is also within the scope of the present invention to have upper and lower layers 26 and 32 formed differently. For example one may be formed of natural fibers and the other of synthetic fibers. Also the resins used to impregnate one web or layer can include an abrasive so that layer can be used for cleaning and the other for high speed buffing.

The first web lower surface 30 is bonded to the upper layer surface 42 and the lower web upper surface 34 is bonded directly to the lower layer surface 44 using suitable adhesives and by methods as described in greater detail later. Any suitable adhesive or glue can be used, such as an elastomer type, resin reinforced, non-flammable adhesive, which is a rubbery-type of glue, such as styrene butadyne. An example of such adhesive is the one made by Swift Adhesives & Coatings, the so-called 18248 Adhesive. Generally, three steps are involved in the bonding process. First the adhesive must be applied to one or both of the adjacent surfaces to be bonded. The second step is that the surfaces must be pressed or married together. The third step is that the glue must then be dried, either oven or air-dried.

Figure 4:
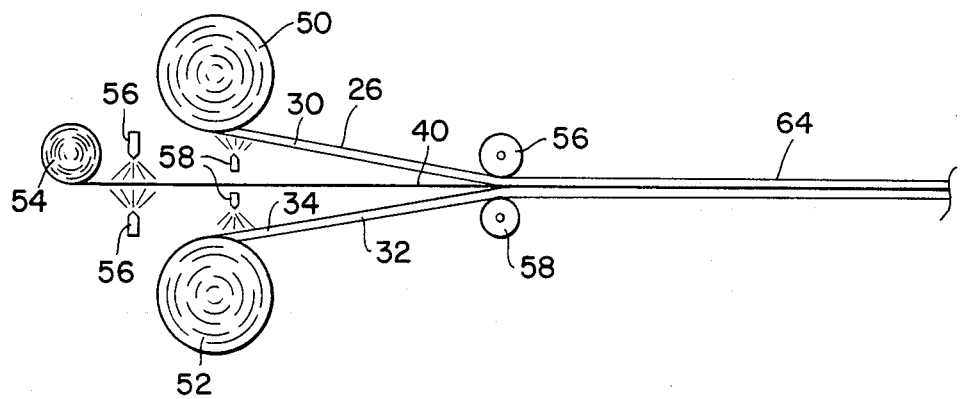
FIG. 4 is a schematic view of a spray method of making the floor cleaning pad of FIG. 1.

One method of bonding is illustrated schematically in FIG. 4 wherein the first and second webs comprise non-woven material previously coated with suitable resins and binders and rolled in rolls 50 and 52. Rolls 50, 52 are positioned so that the upper roll 50 rolls out on its lower surface 30 and the lower roll rolls out on its upper surface 34. The strata layer 40 is in its rolled form in a roll 54 and is positioned between the two webs 26, 34. As the rollers 56 pull the three layers away from their rolls, 50, 52, 54, the interior sides of the webs are sprayed by sprayers 56 with the adhesive and the outer surfaces of the strata layer are sprayed by sprayers 58 with the adhesive. The rolls in addition to moving the layers away from the rolls will slightly compress the three sprayed layers together thereby causing them to stick together. The three-layered pad 64 formed thereby is then transported to a drying room where it can be air dried for a few hours to a day or so. When suitably dried, pad 64 is then dye cut into its circular shape with the center portion 22, as illustrated in FIG. 1, cut as well.

Figure 5:
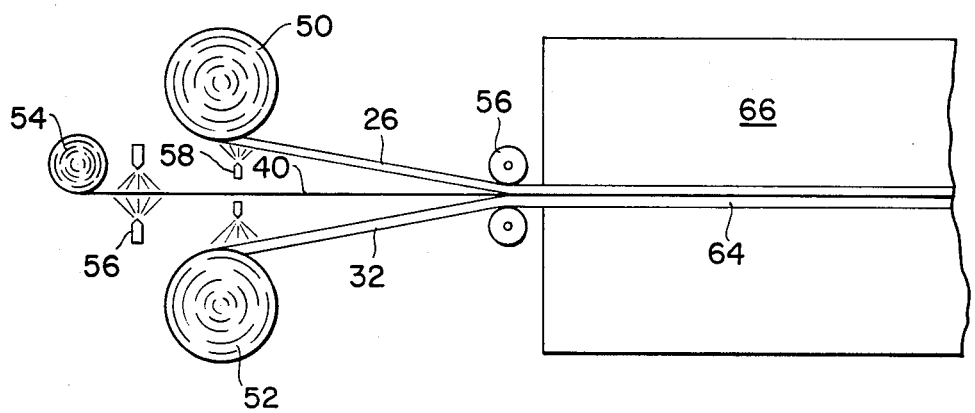
FIG. 5 is a schematic view of an alternative spray method with an oven dry.

FIG. 5 illustrates a variation of the method of FIG. 4 and uses an oven 66 to dry the pressed three-layer pad. The oven can be set at approximately 250° and it would take only about five minutes to dry pad 64 as it is conveyed through it.

Figure 6:
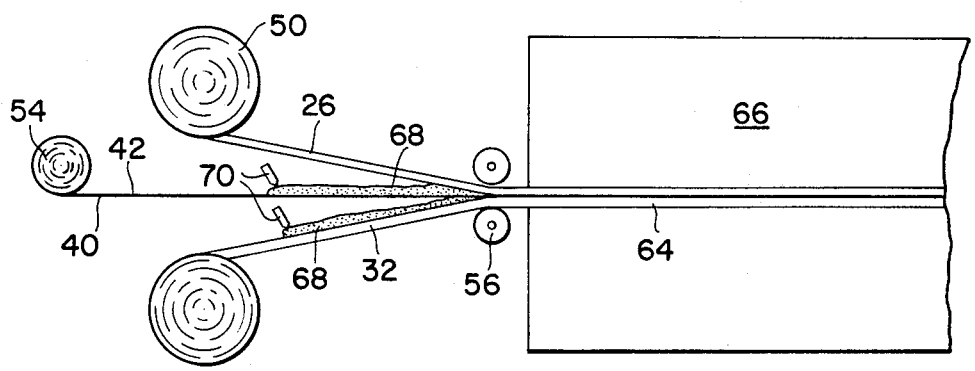
FIG. 6 is a schematic view of an alternative foaming method.

The method of FIG. 6 is similar to that of FIG. 5 except that the adhesive 68 is an aerated or foam-like state and is applied by applicators 70 only to the upper layer surface 42 of the middle strata layer and the upper surface 34 of the lower web. To apply it to the upper surfaces of the layers would not be effective inasmuch as the foam would not stick adequately and fall off. Similarly, the layers are then rolled together by rollers 56 and passed through oven 66 and then dried, and cut to shape. An advantage of this foam method is that it requires less moisture than the glue method and thus uses less liquid, and also by foaming you can get more material over a square yard.

Figure 7:
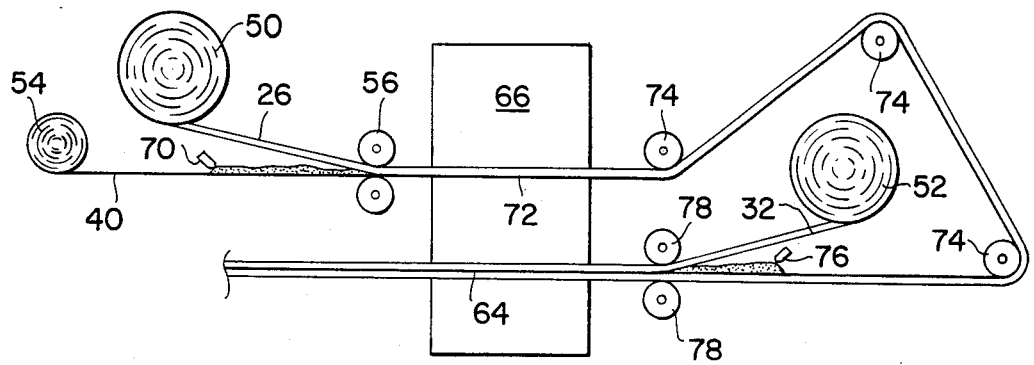
FIG. 7 is a schematic view of an alternative two-pass foam method.
Figure 8:
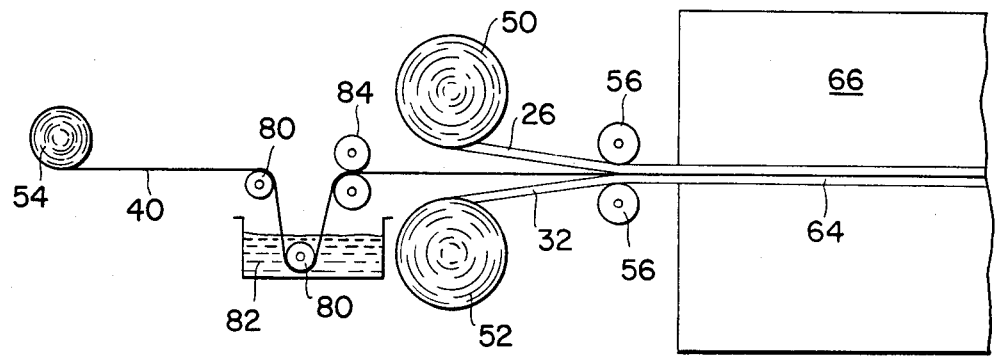
FIG. 8 is a schematic view of an alternative submersion method.

FIG. 7 illustrates a variation of the method of FIG. 8 wherein a so-called two-pass foaming method is used to form reversible pad 20. As shown, the foam is first applied to the upper surface 42 of the middle web 26 by applicator 70 and then the upper web and the middle strata layer 40 are rolled together by rollers and dried in oven 66. The two layer material shown as 72 is then inverted through a series of rollers 74 and the foam applied by applicator 76 to the other side of the web, which is now its upper surface. Then the other web 34 is pressed to it by rollers 78 and the three layer pad 64 passes through the drying oven.

FIG. 8 illustrates yet another method of forming floor cleaning pad 20. Referring thereto, it is seen that the middle strata layer 40 is first submersed via rollers 80 in a bath 82 of adhesive material thereby coating both sides. The coated strata layer then passes through a pair of metering rollers 84 which meters the excess adhesive off of the surfaces back into bath 82. Then the opposed rolls 50, 52 of formed web are umwound onto opposing sides of the middle strata layer, pressed by rollers 56, and oven dried.

Figure 9:
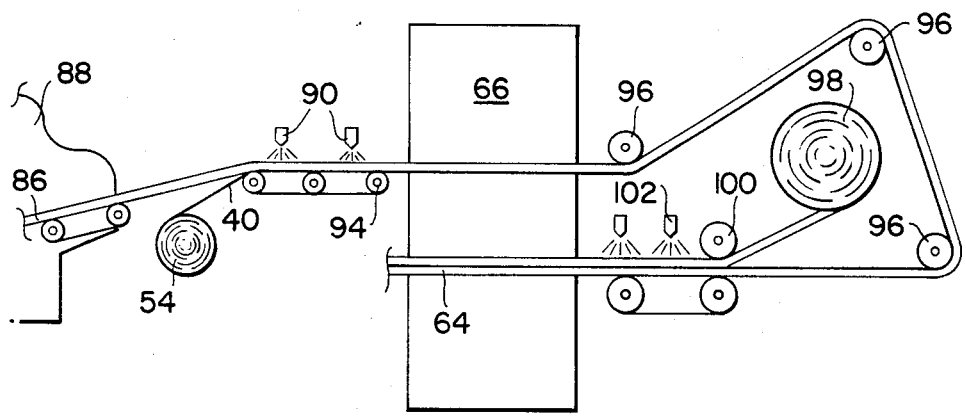
FIG. 9 is a schematic view of an alternative resin-spraying method.

FIG. 9 shows a different method of forming the present floor cleaning pad. It is seen that the web 86 of non-porous air-layered non-woven material is emerging from the so-called Rando machine shown schematically at 88 as described in the incorporated patent. At this point the web has not been sprayed with its resins and binders. The resins and binders are then sprayed by sprayers 90 through the upper surface of the web and penetrate its lower surface onto the strata layer 40 which is positioned below and on top of suitable rollers 94. The two layers then pass through the drying oven 66. They are then inverted through a series of rollers 96. A second roll 98 of non-woven air-layered material prior to being sprayed with the resins and binders is then unrolled and positioned adjacent the exposed opposite surface of the strata layer, by roller 100. The resins and binders are then sprayed by sprayers 102 through the outer surface of the second web until they penetrate the lower surface of the web onto the strata layer thereby causing the web fibers to adhere directly to the strata layer exposed surface. The three layer pad 64 is then passed through the drying oven. The resins and binders thus act as the bonding adhesive. A multi-layer reversible pad adapted to clean hard surface floors at super high speeds without elongating and shredding is thereby formed.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the appended claims.

I claim:

1. A reversible hard-floor cleaning pad comprising:
   a first porous non-woven air-layered web having an upper, floor-cleaning surface and an opposing lower surface,
   said first web upper cleaning surface being adapted to clean hard surface floors when placed on the floor and rotated about a vertical axis passing through the center of said first web at super high speeds of at least 1000 revolutions per minute,
   a second porous non-woven air-layered web having a lower, floor cleaning surface and an opposite upper surface,
   said second web lower cleaning surface being adapted to clean hard surface floors when placed on the floor and rotated about said vertical axis at super high speeds of at least 1000 revolutions per minute,
   said second web being disposed parallel to and spaced from said first web with said first web lower surface facing said second web upper surface,
   a flexible wet-laid nonwoven strata layer having uniform directional strength and an upper layer surface and an opposite lower layer surface,
   said strata layer being disposed between said first web and said second web, and
   a bonding means for bonding said first web lower surface directly to said upper layer surface and said second web upper surface directly to said lower layer surface,
   said first web, said strata layer, said second web, and said bonding means defining a hard-floor cleaning pad having general uniform strength in all directions perpendicular to said vertical axis, so as not to distort at said super high speeds.

2. The floor cleaning pad of claim 1 including,
   said first web having an air-layered shingled surface and an opposite non-shingled random fiber surface, and
   said shingled surface being positioned so as to form said opposite lower surface.

3. The floor cleaning pad of claim 1 including,
   said first web having a first longitudinal structural direction and a second longitudinal structural direction disposed perpendicular to said first direction and having at least 20% greater strength than the strength of said first direction.

4. The floor cleaning pad of claim 1 including,
   said first web being coated with a thermo-set resin binder.

5. The floor cleaning pad of claim 1 including,
   a connecting means for connecting said first web to a floor machine adapted to rotate said floor cleaning pad about said vertical axis at speeds of at least 1000 revolutions per minute with said second web lower surface engaging the hard surface floor in a rapid circular cleaning motion.

6. The floor cleaning pad of claim 5 including,
   said connecting means including a vertical opening passing through said first web, said strata layer, and said second web.

7. The floor cleaning pad of claim 1 including,
   said first and second webs being formed of natural fibers.

8. The floor cleaning pad of claim 7 including,
   said natural fibers comprising pig bristle.

9. The floor cleaning pad of claim 7 including,
   said natural fibers comprising horse hair.

10. The floor cleaning pad of claim 1 including,
    said first and second webs being formed of synthetic fibers.

11. The floor cleaning pad of claim 10 including,
    said synthetic fibers being selected from the group of nylon, polyester, and rayon.

12. The floor cleaning pad of claim 1 including,
    said first and second webs each comprising non-woven high loft media.

13. The floor cleaning pad of claim 1 including,
    said first and second webs being coated with a binder and with a resin.

14. The floor cleaning pad of claim 1 including,
    said strata layer being formed of paper.

15. The floor cleaning pad of claim 1 including,
    said strata layer being formed of a scrim material.

16. The floor cleaning pad of claim 1 including,
    said bonding means including styrene butadyne.

17. The floor cleaning paid of claim 1 including,
said bonding means including an elastomer, resin-reinforced non-flammable adhesive.
18. The floor cleaning pad of claim 1 including,
said first web including a resin coating, and
said bonding means including said resin coating bonding the lower fibers of said first web lower surface directly to said upper layer surface.
19. The floor cleaning paid of claim 1 including,
said first web being formed of natural fibers, and
said second web being formed of synthetic fibers.
20. The floor cleaning pad of claim 1 including,
said first and second webs being coated with a thermo-set resin binder system including a resin selected from the group of pheonilic resin, styrene butadyne, melomine and acrylics.
21. The floor cleaning pad of claim 1 including,
said first web being coated with a resin mixed with an abrasive.

* * * * *